United States Patent
Hashiguchi et al.

(10) Patent No.: US 8,559,728 B2
(45) Date of Patent: Oct. 15, 2013

(54) IMAGE PROCESSING APPARATUS AND IMAGE PROCESSING METHOD FOR EVALUATING A PLURALITY OF IMAGE RECOGNITION PROCESSING UNITS

(75) Inventors: Noriyasu Hashiguchi, Kawasaki (JP); Kinya Osa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 637 days.

(21) Appl. No.: 12/543,768

(22) Filed: Aug. 19, 2009

(65) Prior Publication Data
US 2010/0046840 A1     Feb. 25, 2010

(30) Foreign Application Priority Data
Aug. 20, 2008   (JP) .................. 2008-212036

(51) Int. Cl.
*G06K 9/46* (2006.01)
(52) U.S. Cl.
USPC ............................................. 382/201
(58) Field of Classification Search
None
See application file for complete search history.

(56) References Cited

U.S. PATENT DOCUMENTS

| | | | | |
|---|---|---|---|---|
| 5,475,770 | A | * | 12/1995 | Mittelbach et al. ............ 382/181 |
| 7,162,086 | B2 | * | 1/2007 | Ikeda ............................ 382/182 |
| 7,715,633 | B2 | * | 5/2010 | Kanamoto et al. ............ 382/190 |
| 2001/0036316 | A1 | * | 11/2001 | Kunimasa et al. ............ 382/181 |
| 2009/0122164 | A1 | * | 5/2009 | Maki et al. ................ 348/240.99 |
| 2009/0245570 | A1 | * | 10/2009 | Juza et al. ..................... 382/103 |

FOREIGN PATENT DOCUMENTS

| | | | |
|---|---|---|---|
| JP | 07154096 | * | 6/1995 |
| JP | 11039430 | * | 2/1999 |
| JP | 2002-279348 A | | 9/2002 |
| JP | 2007-086954 A | | 4/2007 |

* cited by examiner

*Primary Examiner* — Vikkram Bali
(74) *Attorney, Agent, or Firm* — Canon USA Inc IP Division

(57) ABSTRACT

An image processing method includes sending test image data to a plurality of image recognition units configured to detect a recognition object from an image, setting an evaluation condition for evaluating a recognition result, evaluating a recognition result of the test image data by each of the plurality of image recognition units under the evaluation condition, and selecting from the plurality of image recognition units an image recognition unit to be used based on an evaluation result by the evaluation.

20 Claims, 4 Drawing Sheets

TEST IMAGE

DESIRED RECOGNITION RESULT (DESIRED FACE POSITIONS RANGE-SPECIFIED BY RECTANGULAR REGIONS)

RECOGNITION RESULT BY IMAGE RECOGNITION UNIT 1

RECOGNITION RESULT BY IMAGE RECOGNITION UNIT 2

RECOGNITION RESULT BY IMAGE RECOGNITION UNIT 3

RECOGNITION RESULT BY IMAGE RECOGNITION UNIT 4

IMAGE PROCESSING APPARATUS AND IMAGE PROCESSING METHOD FOR EVALUATING A PLURALITY OF IMAGE RECOGNITION PROCESSING UNITS

BACKGROUND OF THE INVENTION

1. Field of the Invention

The present invention relates to an image processing apparatus and an image processing method for evaluating a plurality of image recognition processing units.

2. Description of the Related Art

Conventionally, there has been an image recognition apparatus for performing image recognition such as determination of the face of a photographed person, for example. Generally when the respective functions of a plurality of different image recognition apparatuses are compared with one another, the functions have strengths and weaknesses in various conditions such as the image quality, the resolution, the size, and the direction of an image to be recognized. When the plurality of different image recognition apparatuses can be used, it is desirable that the image recognition apparatus to be used is selected depending on a recognition object and a recognition purpose.

Therefore, a method for selecting a recognition apparatus adapted to a recognition purpose has been proposed. For example, Japanese Patent Application Laid-Open No. 2002-279348 discusses a method for selecting from a plurality of different document recognition apparatuses the document recognition apparatus adapted to a recognition purpose depending on an analysis result of an input image. This method, in analysis of an input image, determines whether the input image is in a table format or a document format and detects the size of characters in the image.

In the above-mentioned system, however, a management apparatus is required to previously grasp the characteristics of the plurality of image recognition apparatuses. When the recognition accuracy and the characteristics of the image recognition apparatus are changed by leaning and version upgrading thereof, the recognition accuracy and the characteristics must be updated in the management apparatus. Furthermore, the characteristics of the image recognition apparatus grasped in the management apparatus are not always characteristics conforming to a recognition object actually used by a user and conditions such as a recognition environment. These points make it more difficult to select from the plurality of image recognition apparatuses an image recognition apparatus adapted to the recognition purpose.

SUMMARY OF THE INVENTION

The present invention is directed to enabling a user to select from a plurality of image recognition units an image recognition unit adapted to a recognition purpose.

According to an aspect of the present invention, an image processing apparatus includes a sending unit configured to send test image data to a plurality of image recognition units configured to detect a recognition object from an image, a setting unit configured to set an evaluation condition for evaluating a recognition result, an evaluation unit configured to evaluate a recognition result of the test image data by each of the plurality of image recognition units under the evaluation condition, and a selection unit configured to select from the plurality of image recognition units an image recognition unit to be used based on an evaluation result by the evaluation unit.

According to another aspect of the present invention, an image processing apparatus includes a sending unit configured to send test image data to an image recognition unit configured to detect a recognition object from an image according to each of a plurality of parameters, a setting unit configured to set an evaluation condition for evaluating a recognition result, an evaluation unit configured to evaluate a recognition result of the test image data obtained by the image recognition unit according to each of the plurality of parameters under the evaluation condition, and a selection unit configured to select from the plurality of parameters a parameter to be used based on an evaluation result by the evaluation unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
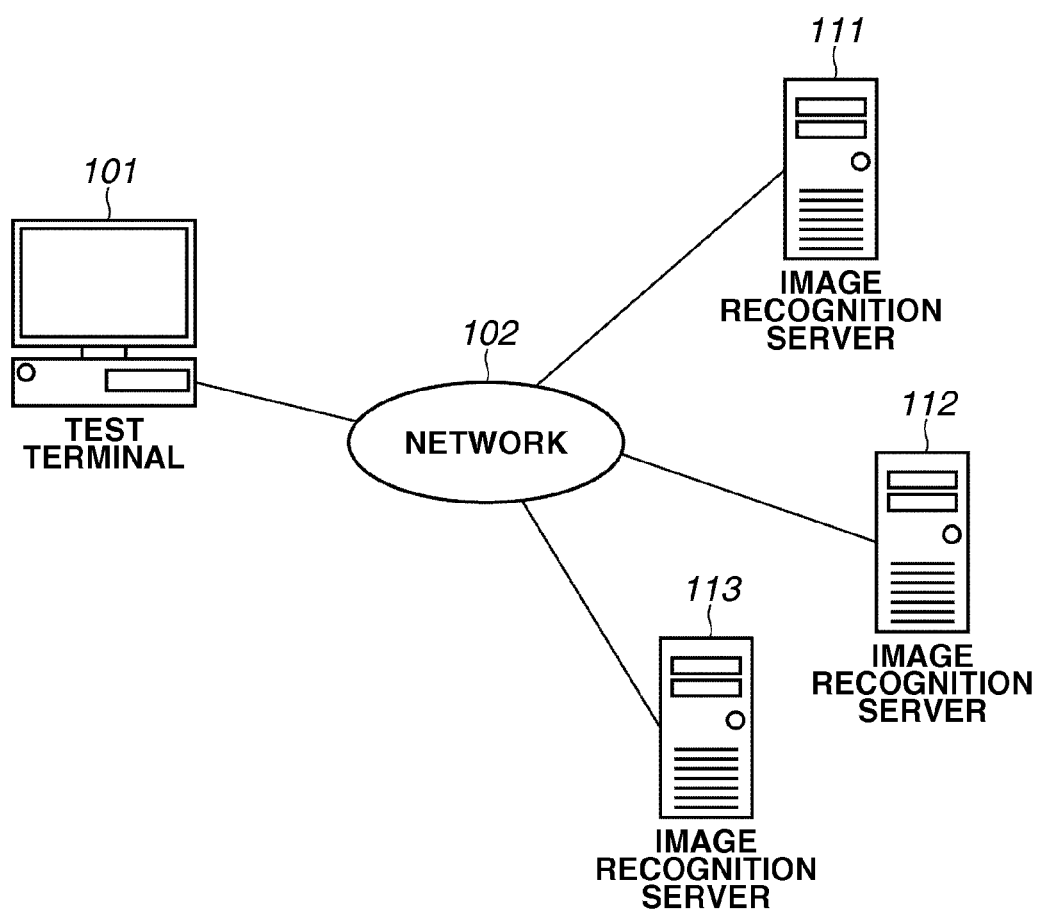
FIG. 1 is a diagram illustrating an example of the configuration of an image recognition system.

FIG. 1 is a diagram illustrating an example of the configuration of an image recognition system according to an exemplary embodiment of the present invention.

In FIG. 1, the image recognition system includes a test terminal 101, an image recognition server 111, an image recognition server 112, and an image recognition server 113, which are connected to one another communicably via a network 102.

Although in the present exemplary embodiment, three image recognition servers are installed, the number of image recognition servers may be more than one. Furthermore, the test terminal 101 and the image recognition servers 111 to 113 may be connected to one another communicably via a plurality of networks, as long as their communication partners are respectively specified. Although the network 102 can be an Internet Protocol (IP) communication network such as a local area network (LAN) or a wide area network (WAN), it may be any communication medium, as long as a sufficient line can be ensured to establish video and audio communication.

The test terminal 101 is composed of a general purpose computer, for example, and communicates with the image recognition servers 111 to 113 via the network 102. The test terminal 101 has the function of transmitting test data to the image recognition servers 111 to 113 to acquire a recognition result of the test data, the function of setting an evaluation condition for evaluating the recognition result of the test data, and the function of evaluating the recognition result of the test data based on the set evaluation condition.

The image recognition servers 111 to 113 recognize and determine a recognition object included in image data (moving image data or still image data) serving as the test data transmitted from the test terminal 101. The image recognition servers 111 to 113 provide, when the image data represents a photographic image (photograph) of a person, a user with an image recognition service for detecting the face of the person, identifying the face of the person, determining whether the person is a man or a woman, and determining the age of the person. The image data may be character image data. The image recognition servers 111 to 113 may be servers for providing a character recognition service.

In the present exemplary embodiment, a photographed image (photograph) of a person, for example, is assumed as an image to be recognized, as described above, to recognize the photographed image. In the present exemplary embodiment, a case where the image recognition servers 111 to 113 respectively use image recognition algorithms that differ in properties is taken as an example. Face detections may be different in their properties, for example, there can be face detection corresponding to only a front image, face detection corresponding to a profile image, face detection corresponding to an image on which the face looks small, and face detection corresponding to an image having low resolution. In the present exemplary embodiment, the image recognition can be performed even when the properties thus differ.

Figure 2:
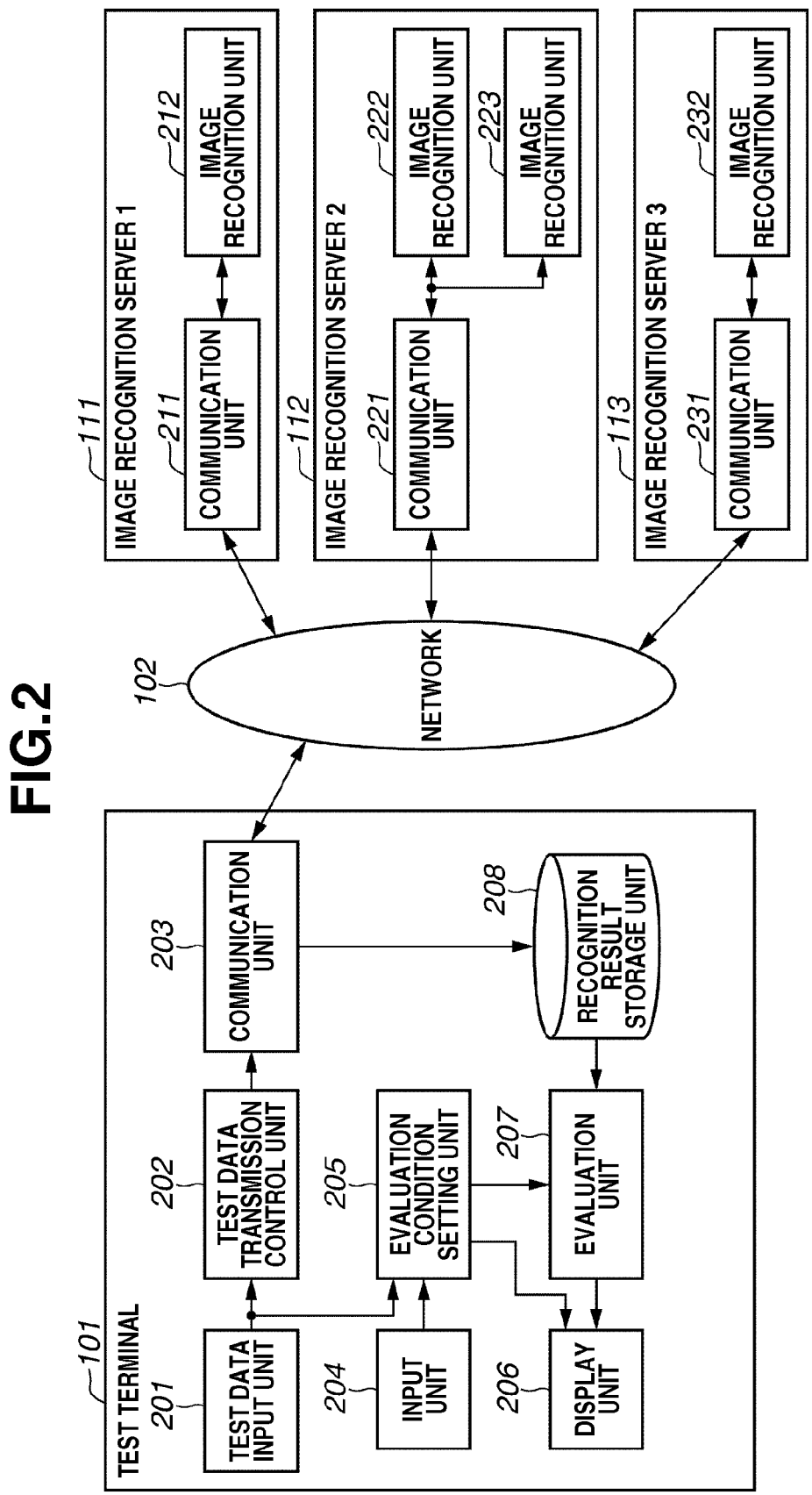
FIG. 2 is a block diagram illustrating the detailed configuration of a test terminal and an image recognition server in the image recognition system.

FIG. 2 is a block diagram illustrating the detailed configuration of the test terminal and the image recognition servers in the image recognition system. FIG. 3A, FIG. 3B, and FIGS. 3C, 3D, 3E, and 3F are diagrams respectively illustrating a test image, a desired recognition result, and respective recognition results by the image recognition units.

In FIG. 2, the test terminal 101 includes a test data input unit 201, a test data transmission control unit 202, a communication unit 203, an input unit 204, an evaluation condition setting unit 205, a display unit 206, an evaluation unit 207, and a recognition result storage unit 208. A communication unit 211 and an image recognition unit 212 are mounted on the image recognition server 111. A communication unit 221 and image recognition units 222 and 223 are mounted on the image recognition server 112. A communication unit 231 and an image recognition unit 232 are mounted on the image recognition server 113.

The communication unit 203 in the test terminal 101 transmits and receives data to and from the image recognition servers 111 to 113 via the network 102. The respective communication units 211, 221, and 231 in the image recognition servers 111 to 113 transmit and receive data to and from the test terminal 101 via the network 102. The respective image recognition units 212, 222, 223, and 232 in the image recognition servers 111 to 113 perform recognition processing for detecting and recognizing a recognition object included in an image.

In the test terminal 101, the test data input unit 201 is used when the user inputs test image data (test data). The test data input unit 201 outputs the input test data to the test data transmission control unit 202. The test data transmission control unit 202 transmits the test data to the image recognition servers 111 to 113 via the communication unit 203 and the network 102. The evaluation condition setting unit 205 sets an evaluation condition for evaluating a recognition result of the image by each of the image recognition servers 111 to 113 based on the input from the user, and outputs the set evaluation condition to the evaluation unit 207.

The input unit 204 is a user interface (e.g., a mouse or a keyboard) for performing a user's operation for an image displayed on the display unit 206 (e.g., an operation for enclosing the face position of a person) and inputting the evaluation condition for the recognition result of the test data. The input unit 204 outputs information corresponding to the user's operation and the input evaluation condition to the evaluation condition setting unit 205. The recognition result storage unit 208 stores the recognition result transmitted from each of the image recognition servers 111 to 113 via the network 102 and the communication unit 203.

The evaluation unit 207 evaluates the recognition result stored in the recognition result storage unit 208 based on the evaluation condition set by the evaluation condition setting unit 205, and outputs an obtained evaluation result to the display unit 206. In other words, the evaluation unit 207 selects from a plurality of recognition results obtained by the plurality of image recognition units a recognition result adapted to the evaluation condition. The display unit 206 displays a graphical user interface (GUI) for the user setting the evaluation condition and the evaluation result. A CPU (not illustrated) provided in the test terminal 101 performs processing illustrated in the flowchart of FIG. 4, described below, based on a control program stored in a memory (not illustrated).

Figure 3A:
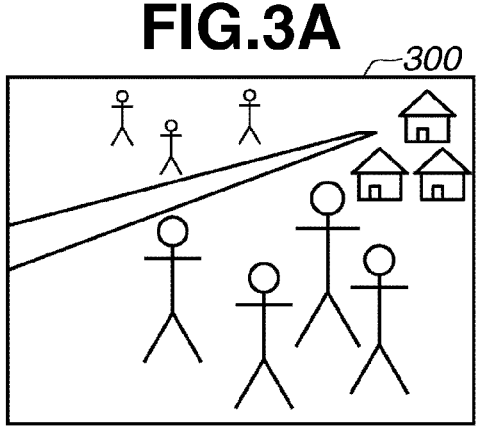
FIGS. 3A to 3F are diagrams illustrating a test image and recognition results.
Figure 3B:
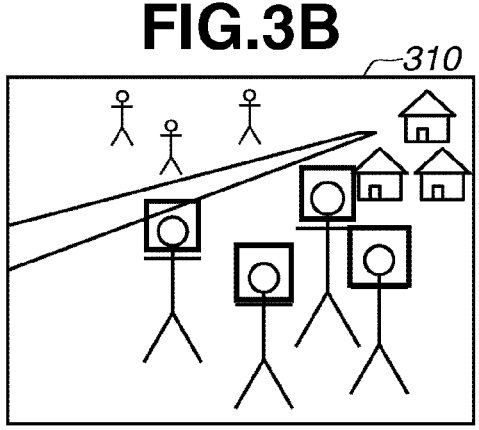

Here, the "evaluation condition" means a combination of a recognition result desired by the user for each of the image recognition units in the image recognition servers 111 to 113 and a determination condition for comparing of the desired recognition result with an actual recognition result. The "desired recognition result" means a result desired by the user for the recognition result obtained by each of the image recognition units. When a detection position is returned to the test terminal 101 as a recognition result from each of the image recognition units, an example of the detection position is as illustrated in FIG. 3B. In a desired recognition result 310 illustrated in FIG. 3B, recognition objects (the face positions of persons) desired by the user are respectively range-specified by rectangular regions.

Although in the present exemplary embodiment, a rectangle is taken as an example of a shape for range-specifying a recognition object, any shape such as an ellipse, a circle, or a shape conforming to the recognition object may be used, as long as the recognition object can be range-specified to determine to which range a detection position belongs. In a group photograph in which the faces of persons line up, for example, the accuracies in evaluation of the rectangle, the circle, and the shape conforming to the recognition object as the shape for range-specifying the recognition object increase in this order. Furthermore, the amount of calculation and the amount of data for determining that the recognition object is within a specified range generally increase if the shape becomes complicated, so that the shape may be determined in response to a request from the user.

The "determination condition" means a condition for comparing the desired recognition result with the actual recognition result, as described above. When a detection position is range-specified by a rectangle as the desired recognition result, for example, it is examined whether the detection position transmitted from each of the image recognition units is inside or outside the specified range. As a result of calculating detection positions, it is determined that the image recognition unit that has transmitted the largest number of detection positions inside the specified range is suitable for image recognition. As another example, the following method is considered. Even if the number of detection positions is two or more inside the specified range, the number of detection positions is taken as one in the range, and it is determined that the image recognition unit that has transmitted the largest number of detection positions inside the specified range is suitable for image recognition.

The operations of the image recognition system according to the present exemplary embodiment having the above-mentioned configuration will be described with reference to FIG. 2 and FIGS. 3A to 3F.

First, the user prepares test image data (test data) to be recognized by each of the image recognition units in the image recognition servers 111 to 113, and inputs the test data from the test data input unit 201 in the test terminal 101. Furthermore, an evaluation condition for a recognition result of the test data is input from the input unit 204, and is set in the evaluation condition setting unit 205. In the present exemplary embodiment, a test image 300 illustrated in FIG. 3A is prepared as the test data. The test image 300 is a photographic image including four persons and three persons respectively appearing on the near side and on the far side and further including a background.

The evaluation condition set in the evaluation condition setting unit 205 by the user is that only the faces of the four persons on the near side, for example, in the test image 300 are detected as a desired recognition result. A determination condition is that no face is detected in addition to a desired recognition result (face positions). Therefore, the user respectively encloses desired face positions by rectangles using the input unit (mouse) 204 while seeing the test image 300 displayed, as illustrated in FIG. 3A, on the display unit 206 to produce information relating to a desired recognition result, to set the desired recognition result (face positions) 310, as illustrated in FIG. 3B.

Then, the user sets a determination condition for comparing an actual recognition result with the desired recognition result in the evaluation condition setting unit 205 using the input unit 204. The following example is considered as the determination condition. For example, the evaluation unit 207 increases a count value when the face position of a person is detected within a rectangular specified range, while decreasing the count value when it is detected outside the rectangular specified range in the desired recognition result 310. As a result, the evaluation unit 207 determines that the image recognition unit that has transmitted the largest count value as the recognition result is suitable for image recognition.

The following methods are considered as a method for determining that a recognition result of a recognition object is detected within a rectangular specified range. There is a method for determining that a recognition result of a recognition object is within a rectangular specified range when the recognition result is represented by point coordinates and the point coordinates exist within the rectangular specified range, for example. Furthermore, there is also a method for determining that a recognition result of a recognition object is within a rectangular specified range when the recognition result is represented by rectangles and rectangles representing an actual recognition result are overlapped with rectangles representing a desired recognition result by not less than a predetermined amount, for example.

The following method is also considered as a method for setting a determination condition. There is a method for a user selecting, from a list of a plurality of determination conditions previously prepared, the desired determination condition using the input unit 204 to set the determination condition, for example. Furthermore, there is a method for creating a program in which a determination condition is described in detail to set the determination condition, for example. The determination condition may be any condition, as long as a recognition result of an image can be quantitatively evaluated.

The evaluation condition is transmitted from the evaluation condition setting unit 205 to the evaluation unit 207. The evaluation unit 207 waits until the recognition result is transmitted from each of the image recognition units in the image recognition servers 111 to 113. After the setting of the evaluation condition is completed in the evaluation condition setting unit 205, the test data transmission control unit 202 transmits the test image 300 to each of the image recognition units in the plurality of image recognition servers 111 to 113 via the communication unit 203 and the network 102. Each of the image recognition units, which have received the test image 300 from the test terminal 101, performs image recognition processing, and transmits an obtained recognition result to the test terminal 101 via each of the communication units and the network 102.

The test terminal 101 stores in the recognition result storage unit 208 the recognition result transmitted from each of the image recognition units. In this case, the image recognition unit 212 detects a recognition result (face positions) 320 illustrated in FIG. 3C for the test image 300. Similarly, the image recognition unit 222, the image recognition unit 223, and the image recognition unit 232 respectively detect a recognition result 330 illustrated in FIG. 3D, a recognition result 340 illustrated in FIG. 3E, and a recognition result 350 illustrated in FIG. 3F. The evaluation unit 207 determines, when rectangles representing each of the recognition results 320, 330, 340, and 350 and rectangles representing the desired recognition result 310 overlap each other, that the recognition result is detected within the rectangular specified range.

Figure 3C:
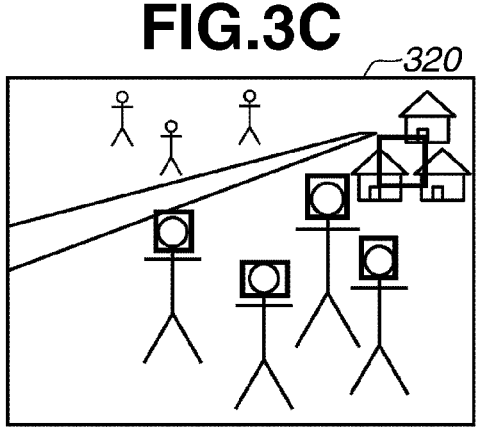
Figure 3D:
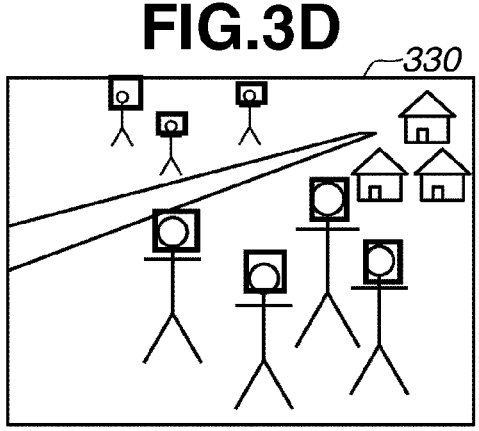
Figure 3E:
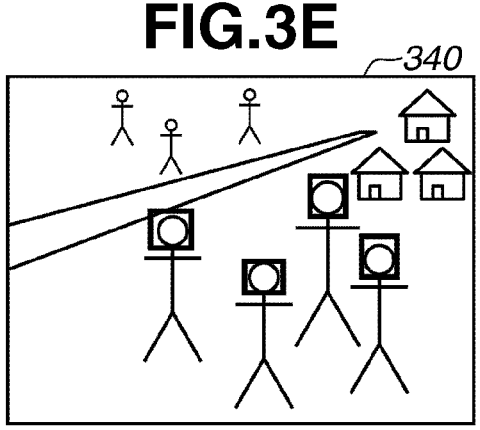
Figure 3F:
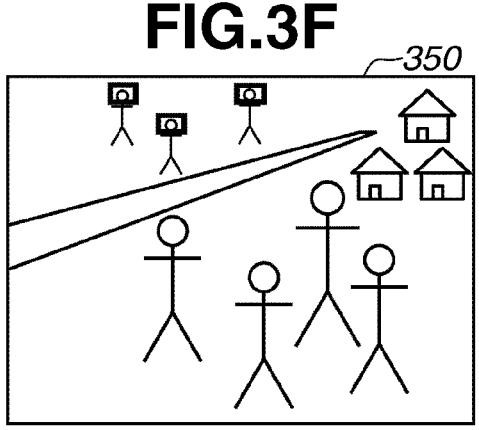

First, in the recognition result 320 illustrated in FIG. 3C, the faces of the four persons on the near side can be respectively detected within the rectangles, and the background is erroneously detected as a face. In the recognition result 330 illustrated in FIG. 3D, all the faces of the persons are detected regardless of whether the face is large or small. In the recognition result 340 illustrated in FIG. 3E, only the large faces, whose sizes are not less than a predetermined size, of the persons are detected (only the faces of the four persons on the near side are detected). In the recognition result 350 illustrated in FIG. 3F, only the small faces, whose sizes are not greater than the predetermined size, of the persons are detected (only the faces of the three persons on the far side are detected).

The recognition result transmitted from each of the image recognition units in the image recognition servers 111 to 113 are evaluated as follows. The evaluation unit 207 evaluates the recognition result using a method for increasing a count value by one if the face within the rectangle specified based on the desired recognition result 310 (specified range) is detected, while decreasing the count value by one if the face outside the specified rectangle (specified range) is detected.

In the recognition result 320, all the four faces in the specified rectangles are detected, and one rectangle (a house) that is not the specified rectangle is detected, so that the count value is 3. In the recognition result 330, all the four faces in the specified rectangles are detected, and three rectangles (the faces of the persons on the far side) that are not the specified rectangles are detected, so that the count value is 1. In the recognition result 340, all the four faces in the specified rectangles are detected, and no rectangle that is not the specified rectangle is detected, so that the count value is 4. In the recognition result 350, the faces in the specified rectangles are not detected, and three rectangles (the faces of the persons on the far side) that are not the specified rectangles are detected, so that the count value is −3.

The evaluation unit 207 determines that the recognition result 340 out of the recognition results 320 to 350 is best matched with the evaluation condition based on the count values respectively calculated for the recognition results 320 to 350. The evaluation unit 207 instructs the display unit 206 to perform display based on the determined evaluation result. This causes the evaluation result by the evaluation unit 207 to be displayed on the display unit 206.

Description has been made of the operations of the test terminal 101 and each of the image recognition units in the image recognition servers 111 to 113 in the image recognition system with reference to FIG. 2 and FIGS. 3A to 3F. Furthermore, the flow of processing performed in the test terminal 101 will be described with reference to the flow chart of FIG. 4.

Figure 4:
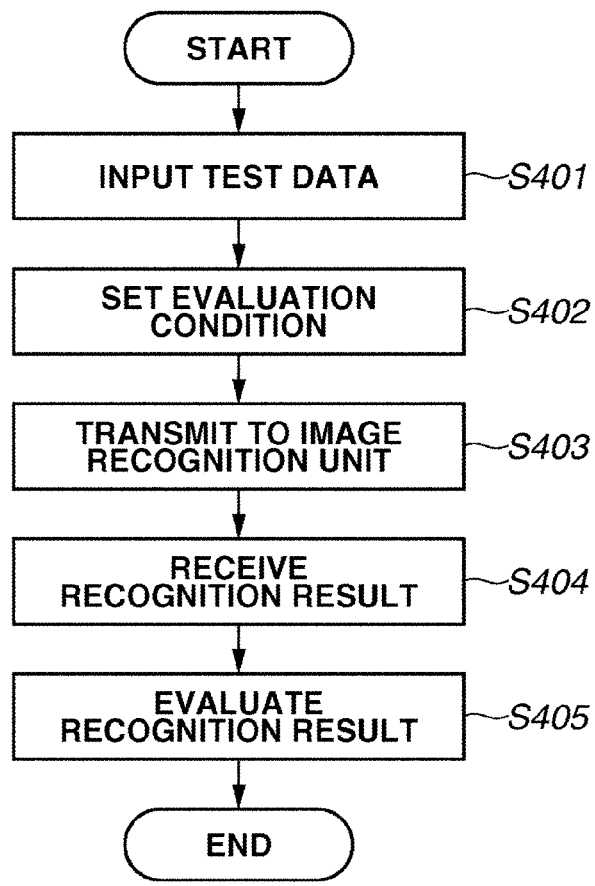
FIG. 4 is a flow chart illustrating the procedure for evaluation of a recognition result in a test terminal.

FIG. 4 is a flow chart illustrating processing for evaluating a recognition result in the test terminal 101.

In FIG. 4, when the user inputs test data from the test data input unit 201 in the test terminal 101, the test data input unit 201 outputs the test data to the test data transmission control unit 202 in step S401. When the user then inputs information relating to a desired recognition result and a determination condition (a condition for comparing an actual recognition result and the desired recognition result) as an evaluation condition from the input unit 204, the evaluation condition setting unit 205 sets the input evaluation condition in step S402.

In step S403, the test data transmission control unit 202 transmits the test data to each of the image recognition units in the image recognition servers 111 to 113 via the communication unit 203 and the network 102. In step S404, the communication unit 203 receives a recognition result of the test data transmitted from each of the image recognition units via the network 102, and the recognition result storage unit 208 stores the received recognition result. In step S405, the evaluation unit 207 evaluates the recognition result stored in the recognition result storage unit 208 according to the evaluation condition set in step S402, and selects the image recognition unit that has transmitted the recognition result adapted to the evaluation condition. Thereafter, data to be actually recognized is recognized using the selected image recognition unit so that a highly precise recognition result can be obtained.

Although in the present exemplary embodiment, the case where the user prepares and produces the test data and the evaluation condition is taken as an example, the present invention is not limited to the same. A provider of the image recognition system may previously produce a plurality of test data and provide the user with the test data. In this case, the user may select from the plurality of test data previously prepared the test data similar to an input image desired to be recognized. Alternatively, the provider of the image recognition system may automatically transmit a method for selecting the test data similar to the input image to the test terminal 101 using a technique for retrieving a similar image.

It need not be after the evaluation condition setting unit 205 completes the setting of the evaluation condition that the test data transmission control unit 202 transmits the test data. The evaluation condition setting unit 205 can also set the evaluation condition during the process of the image recognition processing by the image recognition unit. Furthermore, the recognition result output from the image recognition unit to the test terminal 101 during the setting of the evaluation condition may be temporarily stored in the image recognition unit or the evaluation unit 207 until the setting of the evaluation condition is completed.

As described above, according to the present exemplary embodiment, even when unfamiliar with the characteristics of the plurality of image recognition units, the user can select the image recognition unit adapted to the evaluation condition. Particularly, even when an image recognition algorithm is improved to reduce erroneous detection of the image recognition unit and when the recognition accuracy and the speed of the recognition processing are momentarily changed by learning or the like, the user can select from a plurality of updated image recognition units the image recognition unit adapted to the evaluation condition.

More specifically, the test data is transmitted to the plurality of image recognition units and the recognition result transmitted from each of the image recognition units is evaluated under the specified evaluation condition to compare the plurality of image recognition units, to select the image recognition unit that is most highly appreciated. This enables the user to select from the plurality of image recognition units the image recognition unit adapted to the evaluation condition, that is, adapted to a recognition purpose.

Although in the above-mentioned exemplary embodiment, the configuration in which a plurality of image recognition servers is connected to the test terminal via the network, and the test terminal generates the test data and the evaluation condition while evaluating the recognition result from each of the image recognition units based on the evaluation condition is taken as an example, the present invention is not limited to the same. A single apparatus may have the function of a test terminal and the function of a plurality of image recognition units to generate test data and an evaluation condition, perform image recognition processing, and evaluate a recognition result. Even in this modified example, a similar effect to that in the above-mentioned exemplary embodiment can be obtained.

Although in the above-mentioned exemplary embodiment, the configuration in which a plurality of image recognition units is installed is taken as an example, the present invention is not limited to the same. A single image recognition unit capable of obtaining a plurality of recognition results by changing parameter setting may be installed to switch the setting of parameters in the image recognition unit. The "parameter setting" means fining a detection condition when the face of a person is detected by distinguishing between an adult and a child, for example. In this case, a plurality of recognition results can be also obtained by transmitting test data to the image recognition unit from a test terminal just as when the plurality of image recognition units is installed. From the plurality of recognition results, the recognition result adapted to an evaluation condition is selected.

In this method, every time the parameter setting in the one image recognition unit is switched, the test data must be transmitted, or the test data must be stored and input again. An image recognition unit that varies in characteristics by switching parameter setting and an image recognition unit in which parameter setting is not switched may be mixed. Alternatively, a plurality of image recognition units that differ in parameter setting may exist to be processible in parallel. In the modified example, a similar effect to that in the above-mentioned exemplary embodiment can be also obtained.

According to each of the exemplary embodiment and the modified examples described above, the user can select, based on the plurality of recognition results respectively obtained from the plurality of image recognition units, the image recognition unit that has obtained the recognition result adapted to the evaluation condition. This enables the user to select from the plurality of image recognition units the image recognition unit adapted to the recognition purpose.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-212036 filed Aug. 20, 2008, which is hereby incorporated by reference herein in its entirety.

What is claimed is:

1. An image processing apparatus comprising:
a sending unit configured to send test image data to a plurality of image recognition units configured to detect a recognition object from an image;
a setting unit configured to set an evaluation condition for evaluating a recognition result of each of the plurality of image recognition units, the evaluation condition includes an expected recognition result of the test image data expected by a user and a determination condition for comparing an actual recognition result of the test image data with the expected recognition result of the test image data;
an evaluation unit configured to evaluate the actual recognition result of the test image data by each of the plurality of image recognition units by comparing the actual recognition result with the expected recognition result of the test image data under the determination condition included in the evaluation condition; and
a selection unit configured to select from the plurality of image recognition units an image recognition unit to be used based on an evaluation result by the evaluation unit.

2. The image processing apparatus according to claim 1, further comprising a specifying unit configured to specify a range of a recognition object included in the desired recognition result,
wherein the evaluation unit evaluates the recognition result of the test image data depending on whether a recognition position in the actual recognition result is matched with the range specified by the specifying unit.

3. The image processing apparatus according to claim 2, wherein a shape used when the specifying unit specifies the range includes one of a rectangle, an ellipse, a circle, and a shape conforming to the recognition object.

4. The image processing apparatus according to claim 2, wherein the recognition position in the actual recognition result is a point, and
wherein the evaluation unit determines, when the point is included in the specified range, that the recognition position is matched with the range.

5. The image processing apparatus according to claim 2, wherein the recognition position in the actual recognition result is a region, and
wherein the evaluation unit determines, when the region overlaps the specified range, that the recognition position is matched with the range.

6. The image processing apparatus according to claim 2, wherein the evaluation unit evaluates the recognition result of the test image data based on the number of recognition positions in the actual recognition result that are matched with the specified range or the number of recognition positions that are not matched with the specified range.

7. The image processing apparatus according to claim 1, wherein the plurality of image recognition units is connected to the image processing apparatus communicably via a network.

8. The image processing apparatus according to claim 1, wherein the plurality of image recognition units are provided in the image processing apparatus.

9. An image processing apparatus comprising:
a sending unit configured to send test image data to an image recognition unit configured to detect a recognition object from an image according to each of a plurality of parameters;
a setting unit configured to set an evaluation condition for evaluating a recognition result according to each of the plurality of parameters by the image recognition units, the evaluation condition includes an expected recognition result of the test image data expected by a user and a determination condition for comparing an actual recognition result of the test image data with the expected recognition result of the test image data;
an evaluation unit configured to evaluate the actual recognition result of the test image data obtained by the image recognition unit according to each of the plurality of parameters by comparing the actual recognition result with the expected recognition result of the test image data under the determination condition included in the evaluation condition; and
a selection unit configured to select from the plurality of parameters a parameter to be used based on an evaluation result by the evaluation unit.

10. The image processing apparatus according to claim 9, further comprising a specifying unit configured to specify a range of a recognition object included in the desired recognition result,
wherein the evaluation unit evaluates the recognition result of the test image data depending on whether a recognition position in the actual recognition result is matched with the range specified by the specifying unit.

11. The image processing apparatus according to claim 10, wherein a shape used when the specifying unit specifies the range includes one of a rectangle, an ellipse, a circle, and a shape conforming to the recognition object.

12. The image processing apparatus according to claim 10, wherein the recognition position in the actual recognition result is a point, and
wherein the evaluation unit determines, when the point is included in the specified range, that the recognition position is matched with the range.

13. The image processing apparatus according to claim 10, wherein the recognition position in the actual recognition result is a region, and
wherein the evaluation unit determines, when the region overlaps the specified range, that the recognition position is matched with the range.

14. The image processing apparatus according to claim 10, wherein the evaluation unit evaluates the recognition result of the test image data based on the number of recognition positions in the actual recognition result that are matched with the specified range or the number of recognition position that are not matched with the specified range.

15. The image processing apparatus according to claim 10, wherein the image recognition unit is connected to the image processing apparatus communicably via a network.

16. The image processing apparatus according to claim 10, wherein the image recognition unit is provided in the image processing apparatus.

17. An image processing method comprising:
sending test image data to a plurality of image recognition units configured to detect a recognition object from an image;
setting an evaluation condition for evaluating a recognition result of each of the plurality of image recognition units, the evaluation condition includes an expected recognition result of the test image data expected by a user and a determination condition for comparing an actual recognition result of the test image data with the expected recognition result of the test image data;
evaluating the actual recognition result of the test image data by each of the plurality of image recognition units by comparing the actual recognition result with the expected recognition result of the test image data under the determination condition included in the evaluation condition; and
selecting from the plurality of image recognition units an image recognition unit to be used based on an evaluation result by the evaluation.

18. A non-transitory computer-readable storage medium that stores a program for instructing a computer to implement the image processing method according to claim 17.

19. An image processing method comprising:
sending test image data to an image recognition unit configured to detect a recognition object from an image according to each of a plurality of parameters;
setting an evaluation condition for evaluating a recognition result according to each of the plurality of parameters by the image recognition units, the evaluation condition includes an expected recognition result of the test image data expected by a user and a determination condition for comparing an actual recognition result of the test image data with the expected recognition result of the test image data;
evaluating the actual recognition result of the test image data obtained by the image recognition unit according to each of the plurality of parameters by comparing the actual recognition result with the expected recognition result of the test image data under the determination condition included in the evaluation condition; and
selecting from the plurality of parameters a parameter to be used based on an evaluation result by the evaluation.

20. A non-transitory computer-readable storage medium that stores a program for instructing a computer to implement the image processing method according to claim 19.

\* \* \* \* \*